United States Patent
Sicher

(10) Patent No.: US 6,724,986 B1
(45) Date of Patent: Apr. 20, 2004

(54) UNDERWATER CAMERA

(76) Inventor: Charles P. Sicher, P.O. Box 742, Fowlerville, MI (US) 48836

( * ) Notice: Subject to any disclaimer, the term of this patent is extended or adjusted under 35 U.S.C. 154(b) by 101 days.

(21) Appl. No.: 10/195,667

(22) Filed: Jul. 16, 2002

(51) Int. Cl.$^7$ .................. G03B 17/08; G03B 17/02; H04N 7/18
(52) U.S. Cl. ............... 396/27; 396/535; 348/81
(58) Field of Search ................ 396/25, 27, 429, 396/535; 348/81

(56) References Cited

U.S. PATENT DOCUMENTS

| | | | |
|---|---|---|---|
| 2,057,146 A | * 10/1936 | Heath | 348/81 |
| 5,778,259 A | 7/1998 | Rink | 396/27 |
| 5,938,469 A | 8/1999 | Ford et al. | 439/459 |
| 6,057,879 A | 5/2000 | Weber | 348/81 |
| 6,064,824 A | 5/2000 | Rink | 396/25 |
| 6,128,441 A | * 10/2000 | Kamata et al. | 396/25 |
| 6,262,761 B1 | 7/2001 | Zernov et al. | 348/81 |

* cited by examiner

Primary Examiner—Christopher Mahoney
(74) Attorney, Agent, or Firm—Charles W. Chandler

(57) ABSTRACT

A submersible underwater housing for a waterproof camera is adapted to hold the camera in either a vertical or a horizontal viewing position. The housing has a rudder to guide the camera when the camera is disposed in a moving body of water.

5 Claims, 2 Drawing Sheets

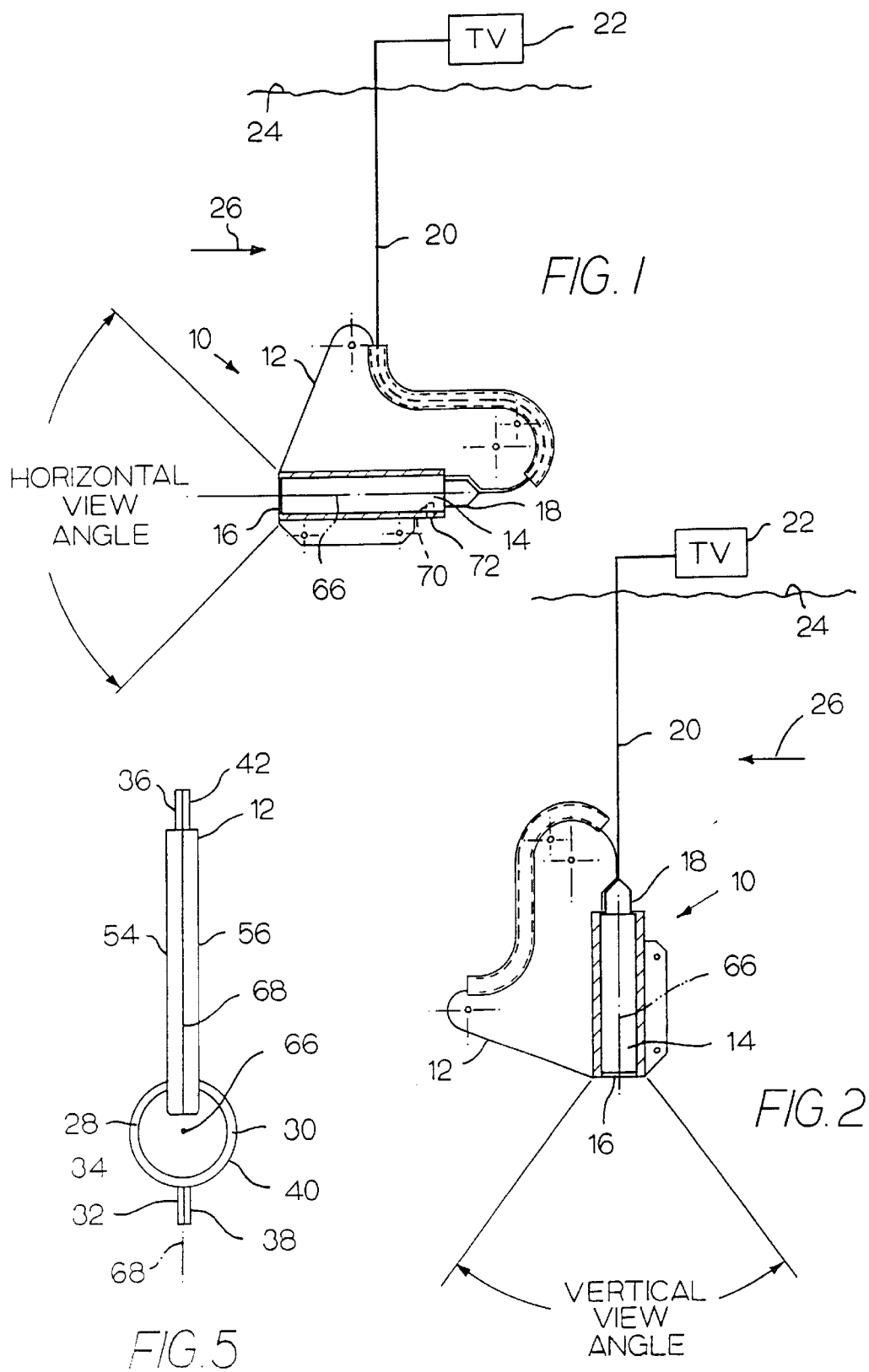

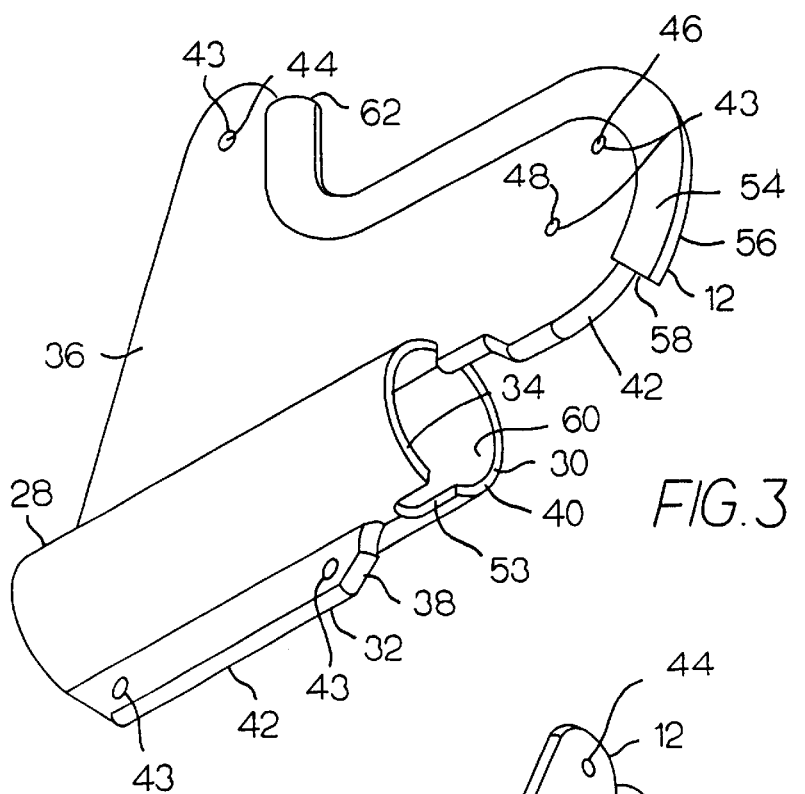
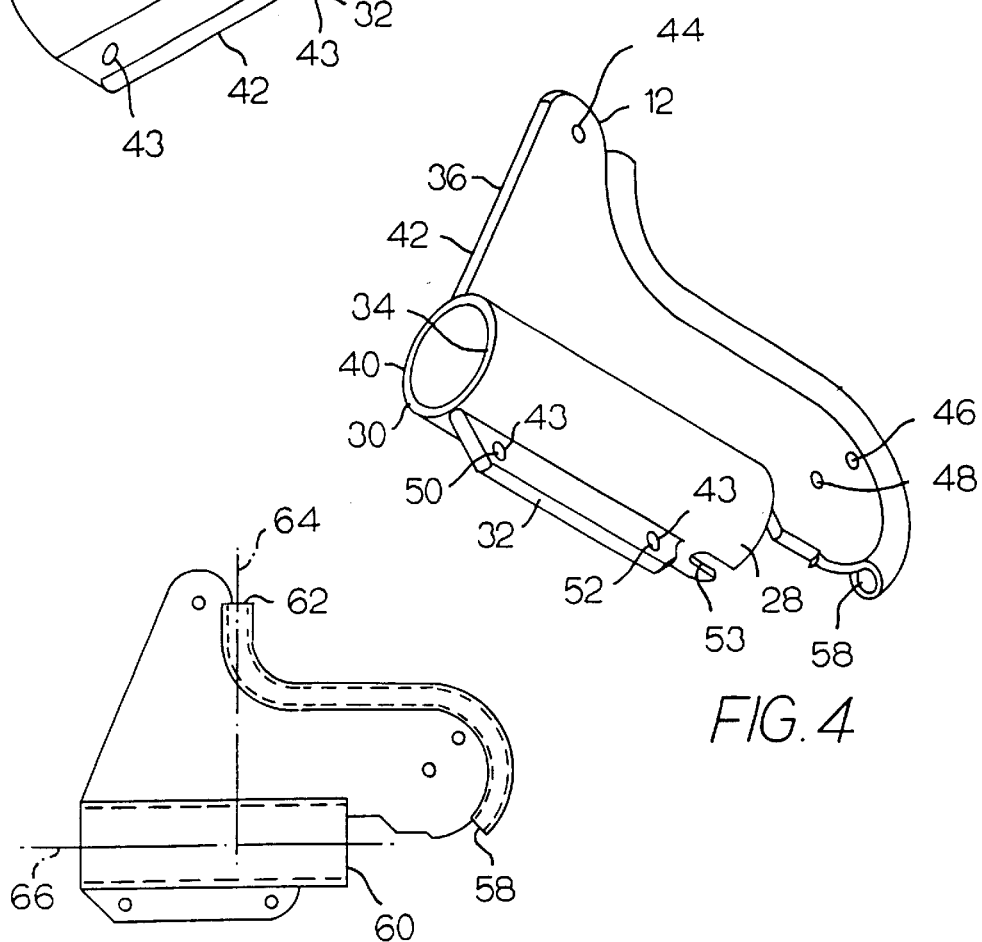

UNDERWATER CAMERA

BACKGROUND AND SUMMARY OF THE INVENTION

Underwater surveillance cameras are used for viewing underwater objects from a boat or the like. They are particular popular with fishermen who want to explore either underwater structure or the presence of fish.

Such underwater surveillance water apparatus may be found in U.S. Pat. No. : 6,262,761 issued Jul. 17, 2001 to Jeffrey P. Zernov and Anthony L. Capra for "Submersible Video Viewing System"; U.S. Pat. No. 6,064,824 issued May 16, 2000 to Philip A. Rink for "Underwater Camera Housing"; U.S. Pat. No. 6,057,879 issued May 2, 2000 to Eric D. Weber for "Fishing Surveillance Device"; U.S. Pat. No. 5,938,469 issued Aug. 17, 1999 to Richard Ford and Randolph K. Ford for "Underwater Connector"; and U.S. Pat. No. 5,778,259 issued Jul. 7, 1998 to Philip A. Rink for "Underwater Video Camera Housing".

The broad purpose of the present invention is to provide an improved underwater viewing apparatus which includes a housing for supporting a commercially available waterproof submersible camera, such as distributed by Strategic Vista Corporation of Markham, Ontario, Canada. Such a camera is elongated with a generally cylindrical housing. A cable is connected to one end of the housing. The other end of the housing supports the lens. The cable has a sufficient length that the user can submerge the camera at a desirable depth in the water while the upper cable end, above the water level, is connected to a viewing device, such as a television or a video camera recording device.

The preferred housing is formed in two symmetrical halves. Part of the housing has a planar configuration forming a rudder that is connected to a tubular camera supporting structure. The camera supporting structure is open at its opposite ends. The camera is clamped in the housing such that it may be suspended in a flowing body of water with the camera lens facing downwardly and the rudder guiding the camera in a stabilized position. The camera angle is adjusted by the user twisting the cable.

The housing has a cable-receiving channel around the periphery of the rudder so that the cable exits the housing at a 90° angle with respect to the axis of the camera. When the cable is connected in this fashion, the camera is suspended in a horizontal position.

The preferred apparatus provides an efficient and economical housing for suspending the camera in alternate underwater viewing positions. The cable can be manipulated to adjust the camera to different viewing angles with respect to the water current.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which:

FIG. 1 is a partially sectional view of a preferred underwater viewing apparatus in which the camera is supported in a horizontal position;

FIG. 2 is a partially sectional view similar to FIG. 1 but in which the camera is supported in an alternate, vertical viewing position;

FIG. 3 is a perspective view showing one end of the camera supporting body;

FIG. 4 is a perspective view showing the other end of the camera supporting body;

FIG. 5 is a view of one end of the camera supporting body; and

FIG. 6 is an elevational view of the camera supporting body.

DESCRIPTION OF THE PREFERRED EMBODIMENTS

FIG. 1 illustrates a preferred underwater viewing apparatus 10 which comprises a body 12 and a viewing camera 14. The camera is preferably a submergible camera distributed by Strategic Vista Corp. and has an elongated cylindrical housing with a viewing lens 16 at one end and a cable connecting end 18. An elongated camera viewing cable 20 has one end connected to cable end 18 of the camera and an opposite end connected to a video viewing apparatus such as a television 22 which may be mounted in a boat or the like on a body of water 24. The body of water may have a current flowing in the direction of arrow 26.

FIGS. 3–6 illustrate body 12 which is formed of two symmetrical halves 28 and 30. The two halves are formed of any suitable plastic. Half 28 includes a lower flange 32, a semi-cylindrical camera-supporting structure 34 and a planar rudder structure 36. Similarly, the other body half 30 includes a lower flange 38, a semi-cylindrical tubular camera supporting structure 40 and a planar rudder structure 42. The two halves are joined together as illustrated in FIGS. 4 and 5, and connected by suitable threaded fastener means 43 at locations 44, 46 and 48 in the rudder structure, and 50 and 52 in the flanges.

The two rudder structures are joined in a face-to-face relationship to form a rudder adjacent the tubular camera supporting structures. The camera is clamped between the tubular camera supporting structures when the two halves are joined together.

When the two halves 28 and 30 are joined together they form a slot 53.

One body half has a semi-cylindrical channel 54 which mates with a semicylindrical channel 56 on the other body half around the periphery of the rudder. When joined together, one end of the two channels forms an opening 58 which faces opening 60 of the body. The opposite end of the two channels forms an opening 62 which is disposed along an axis 64 that is at right angles to the central axis 66 of the tubular camera supporting structure (the longitudinal axis of the camera).

Referring to FIG. 5, the two rudder structures, when joined together, are disposed in a plane 68, that contains the central axis 66 of the camera supporting structure and the center of top opening 62.

When the camera is to be supported for horizontal viewing as illustrated in FIG. 1, the cable is strung between the channels and exits through top opening 62 at right angles to the longitudinal axis 66 of the camera.

The camera cable can be removed from the channels to support the camera in the vertical position illustrated in FIG. 2 for viewing bottom structure. In either position, the rudder provides means for aligning the camera so that it remains in a fairly stable position with respect to the current flow.

The camera has a tapped opening 70, see FIG. 1. The tapped opening is aligned with slot 53, and a threaded fastener 72 connects the camera to the housing so that the image viewed by the camera is properly aligned with the housing. Fastener 72 also prevents the camera from sliding out of its clamped position.

The camera supporting body is formed of relatively inexpensive components, is easy to assemble and provides a compact steering device for the camera.

Having described my invention, I claim:

1. A submersible video viewing apparatus, comprising:
   a camera having a viewing lens with a viewing axis, and encased in a waterproof housing;
   a viewing cable having one end connected to the camera and an opposite end adapted to be connected to a video viewing apparatus when the camera is suspended beneath the video viewing apparatus in a body of water;
   a housing having means for supporting the camera in a first viewing position in which the camera viewing axis is aligned with the cable in a suspended position in the body of water when the camera is suspended by the cable, the housing having structure for connecting the cable to the housing whereby the camera is disposed in a second viewing position when the camera is suspended by the cable in a body of water; and
   the housing being formed of two generally symmetrical halves which when joined together form both a rudder, and said housing for receiving the camera between said two halves.

2. A submersible video viewing apparatus as defined in claim 1, in which the camera is elongated and disposed in a generally upright position in said first viewing position, and in a generally horizontal position when the camera is disposed in the second viewing position.

3. A submersible viewing apparatus as defined in claim 1, in which the center of gravity of the camera is aligned with the cable in either of said viewing positions.

4. A submersible viewing apparatus as defined in claim 1, in which the body has a channel for holding the cable when the camera is in one of said viewing positions.

5. A submersible viewing apparatus as defined in claim 1, in which the channel is disposed around the periphery of the rudder.

* * * * *